J. C. KAMP & C. BROWN.
Baling Cut Hay.
No. 206,797.    Patented Aug. 6, 1878.
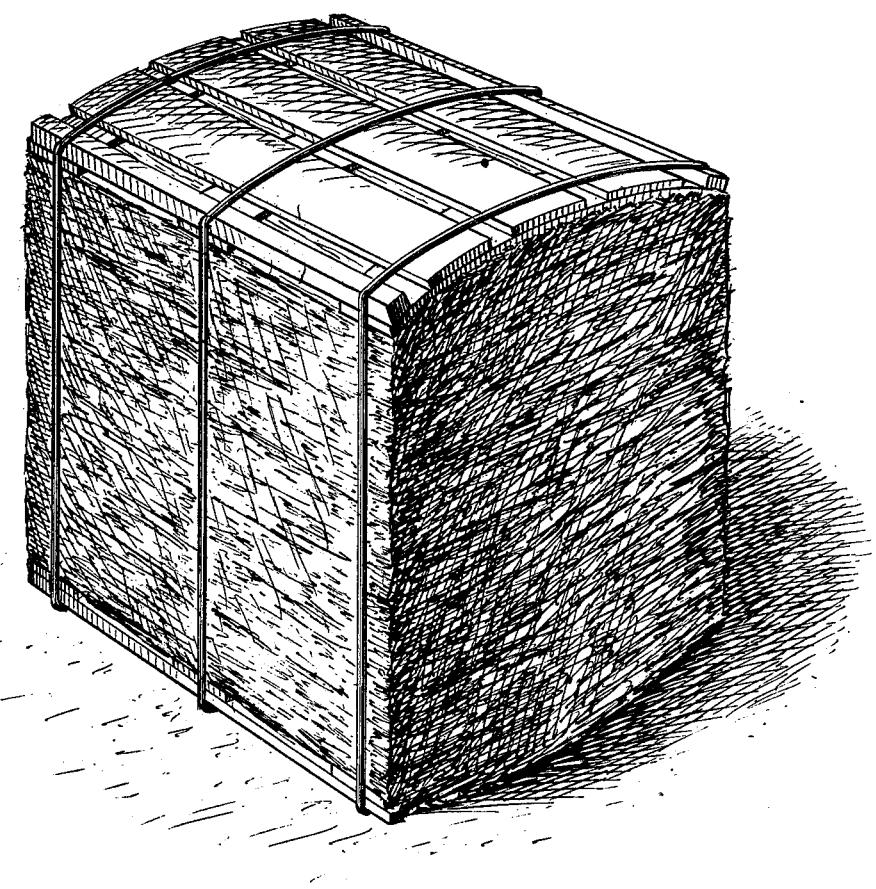

UNITED STATES PATENT OFFICE.

JACOB C. KAMP AND CHARLES BROWN, OF NEW YORK, N. Y.

IMPROVEMENT IN BALING CUT HAY.

Specification forming part of Letters Patent No. 206,797, dated August 6, 1878; application filed March 2, 1878.

*To all whom it may concern:*

Be it known that we, JACOB C. KAMP and CHARLES BROWN, of the city, county, and State of New York, have invented a new and useful Improvement in Baled Cut Hay; and we do hereby declare that the following is a full, clear, and exact description of the same, reference being had to the accompanying drawing, which forms part of this specification, and which represents a perspective view of a bale of cut hay.

This invention consists in moistening of short-cut hay for and previous to baling with a brine or solution of common salt, and baling it while so moistened, whereby several desirable results are obtained, the most important of which are, first, that a degree of adhesiveness is produced between the particles which prevents the hay from wasting so much from the exposed outer portions of the bale in handling and transportation; second, that the cut hay is enabled to be packed into a less compass than has heretofore been practicable; and, third, that the hay is better preserved against souring or decay.

In carrying out our invention it is preferable that the brine be a saturated solution, and that it be applied to the short-cut hay at a temperature as nearly as practicable at the boiling-point.

The way in which we propose generally to apply it is as follows: The brine, being heated in a suitable tank, is delivered therefrom by a very finely perforated sprinkler in the form of a fine spray-like shower, which is caused to fall upon or be distributed among the cut hay as the latter is delivered by an elevator from the cutter into a bin, from which it is taken for baling. About one gallon of brine may be applied for every hundred pounds of cut hay.

The moistened cut hay is preferably fed into the box of the baling-press to be baled while retaining in it as much as possible of the heat imparted to it by the brine, and is tamped from time to time as the box is filled. The pressing and binding may in other respects be performed in the usual way, the binding and the exterior covering of slats or other contrivances, so far as any covering may be employed, being of any suitable kind.

Short-cut hay heated with brine in this way after cutting and before baling, and baled while still moist, may, with the same amount of power applied in pressing the bale, be compressed into about twenty-five per cent. less bulk than the same quantity of cut hay baled in a dry state; and hence not only is there a saving of storage-room, or of storage in transportation, but, owing to its greater compactness, it is less liable to be penetrated by rain or by wet or the moisture in the hold of a vessel. Moreover, the salt contained in the hay while it is so compressed tends to exclude moisture as well as prevent the souring or decay of hay. What is, however, perhaps the most important result of all is the adhesion produced by the salt between the particles of the cut hay and the prevention of the very considerable loss which results from the falling away of the hay from the uncovered portions of the exterior of bales of ordinary cut hay.

This treatment of the hay with brine also enables new hay to be baled earlier in the season without danger of spoiling, resulting from imperfect drying or curing, than is practicable when the hay is not so treated.

We are well aware that the practice of salting hay is old, as well as cutting and baling the same, and we do not claim, broadly, salted, cut, and baled hay; but

What we claim is—

The process herein described of treating short-cut hay, the same consisting in moistening the same with hot saturated brine, and then tamping and compressing the hay before cooling and while subjected to the softening action of heat and moisture, whereby it is compressed into a compact bale, substantially as specified.

JACOB C. KAMP.
CHARLES BROWN.

Witnesses:
VERNON H. HARRIS,
FRED. HAYNES.